UNITED STATES PATENT OFFICE.

JOHN HARVEY KELLOGG, OF BATTLE CREEK, MICHIGAN.

FOOD COMPOUND.

1,001,149.  Specification of Letters Patent.  Patented Aug. 22, 1911.

No Drawing.  Application filed October 19, 1908. Serial No. 458,549.

*To all whom it may concern:*

Be it known that I, JOHN HARVEY KELLOGG, a citizen of the United States, residing at Battle Creek, Michigan, have invented certain new and useful Improvements in Food Compounds, of which the following is a specification.

This invention relates to improvements in food products.

The main object of this invention is to provide an improved food product which is palatable and nourishing and one adapted for use as a meat substitute.

A further object is to provide a food embodying these advantages which can be very economically produced.

Further objects will definitely appear from the detailed description to follow.

The invention is clearly defined and pointed out in the claim.

In the preparation of my improved food product, I use the following ingredients in about the following proportion: Gluten, one pound; potato meal, one pound; oil, preferably vegetable oil, one-quarter pound; one egg to each pound of the potato, or two pounds of the gluten and potato; a yeast product either in the form of concentrated yeast extract or what I designate herein as the crude yeast product, which I will describe later, when the concentrated yeast extract is used the proportion should be two to four grams of extract to each pound of the other ingredients. When the crude product is used, the proportion should be one to two ounces to a pound of the other ingredients; and salt to taste. I preferably prepare and combine these ingredients in the following manner: I prepare the gluten preferably from wheat flour by washing out the starch, the gluten being used in its wet condition. The potatoes are prepared by steaming for about thirty minutes at 225° Fahrenheit, and mashed. The yeast product is prepared by diluting yeast, such as brewers' waste yeast, with water, and washing through a fine sieve, to remove the bitter hop resin which is found for the most part in particles larger than the yeast. The mixture is then placed in bags of stout ducking or the like, and pressed. The moist yeast thus obtained is then treated by the application of 2 to 5% of salt, which is thoroughly mixed with the yeast. Under the influence of the salt, the yeast envelops are broken, and the soluble matters contained therein are set free, the mass becoming liquefied to about the consistency of cream. The product may be used in this condition, which I designate as the crude product, or water may be added thereto, filtered and concentrated, or the unconcentrated liquid may be used as a substitute for the water in the mixing, with the other ingredients. There are several ways or processes in which this extract can be obtained or the yeast cells ruptured so as to give up or free their contents. The process outlined is, however, simple and economical, and the product is free from any substance which would be in any way objectionable in my improved food.

The concentrated extract has a flavor very closely resembling that of meat extract.

The egg is preferably combined by mixing with the potato, and the potato, gluten, oil and salt combined and thoroughly mixed, preferably by passing the same several times through a shredding machine. Fresh or desiccated eggs may be used as desired. The yeast product can be added during the mixing, but I preferably introduce the same by first mixing with the water, which is used to moisten the mixture. This mixture is then placed in cans, sealed and cooked for several hours, preferably about six hours, at approximately 225° Fahrenheit. The temperature and length of time of cooking can be greatly varied and a desirable food product produced. However, I prefer to cook about as I have indicated, as this secures a complete cooking and blending of the materials.

I preferably use a vegetable oil, as stated, and find that corn oil, or the oil of nuts or the like, is satisfactory for this purpose, and I thus secure a compound adapted as a meat substitute, having a vegetable origin. Animal oils can be used and a very satisfactory product is obtained by the use of butter.

After the final cooking, the food is ready for serving and may be served either directly from the cans, or may be prepared in a great variety of ways in imitation of different meat dishes. By this treatment, the product is given a meaty, fibrous consistency and is quite like some meats in flavor and in food elements.

My improved food product is very nourishing and is used as a meat substitute, for which it is especially designed by me, although its use, of course, is optional. If it is desired, my improved food product may be dried after cooking and used as a powder in making soups, broths, and like preparations. In a dried form, it has the advantage of lightness.

While I prefer to combine the ingredients in about the proportions specified, I desire to state they may be considerably varied, although such variations will, of course, vary more or less the food elements. A very satisfactory product is secured when the egg is omitted, and, of course, is considerably cheaper. I ordinarily use Irish potatoes, although sweet potatoes may be used and also other vegetables possessing qualities similar to potato.

My improved product possesses excellent keeping qualities, and, as before remarked, may be used in a great variety of ways.

While the elements may be arranged and treated very effectively and economically by the process I have described, I am aware that there are numerous other ways of accomplishing the same results.

Having thus described my invention, what I claim as new and desire to secure by Letters Patent, is:

An improved food compound comprising gluten, potato and yeast products combined and cooked in about the proportions stated into a homogeneous mixture of meat-like flavor and fibrous texture.

In witness whereof, I have hereunto set my hand and seal in the presence of two witnesses.

JOHN HARVEY KELLOGG. [L. S.]

Witnesses:
E. E. SMITH,
LETHA PETTENGILL.